Nov. 26, 1940.  E. G. MANGELS  2,222,982
LOCOMOTIVE DRIVING WHEEL
Filed June 8, 1939
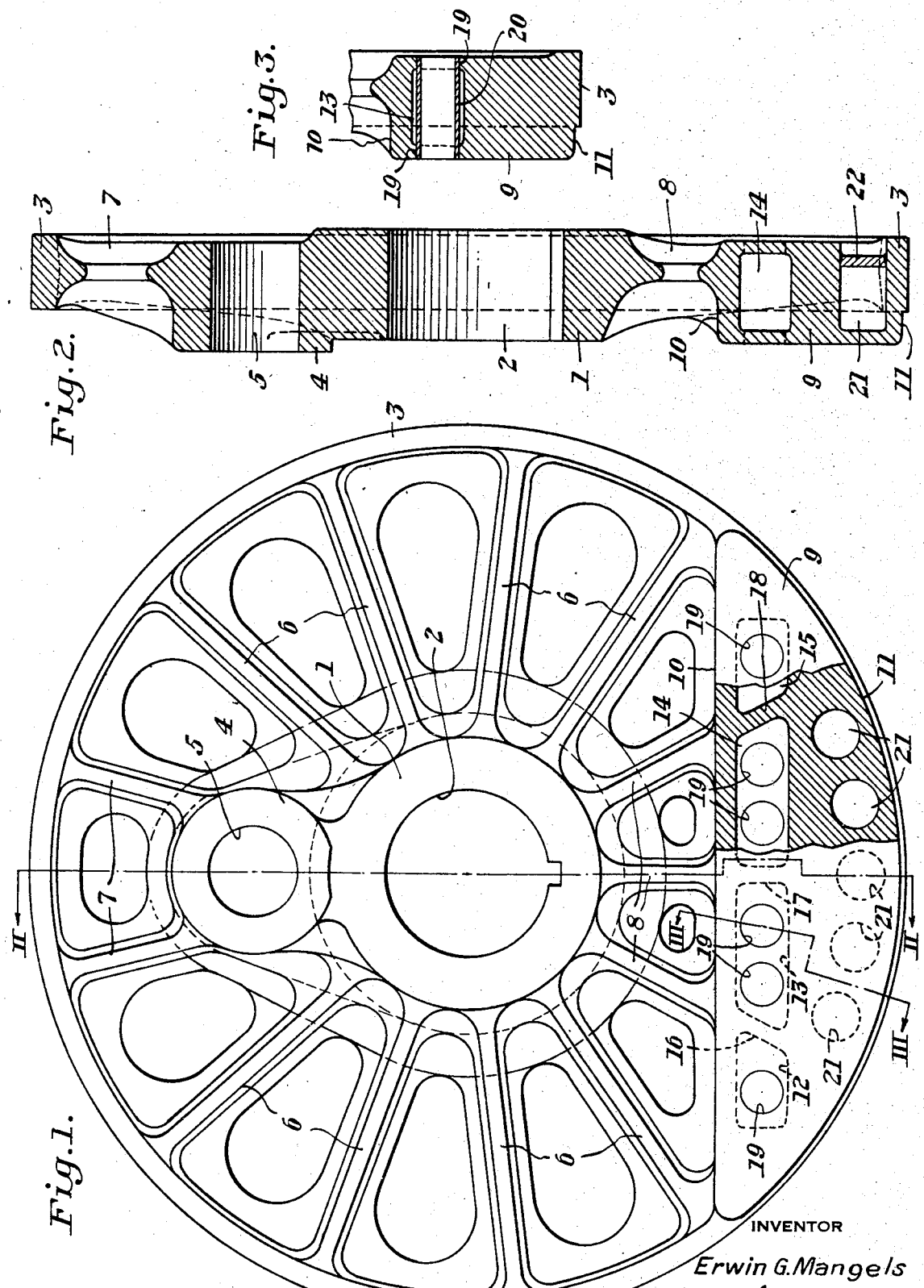
INVENTOR
Erwin G. Mangels
by his attorneys
Stebbins, Blenko & Parmelee Patented Nov. 26, 1940

2,222,982

UNITED STATES PATENT OFFICE 2,222,982

LOCOMOTIVE DRIVING WHEEL

Erwin G. Mangels, Davenport, Iowa, assignor to Blaw-Knox Company, Pittsburgh, Pa., a corporation of New Jersey Application June 8, 1939, Serial No. 278,126

2 Claims. (Cl. 295—6)

The present invention relates to locomotive driving wheels and more particularly to a casting for a locomotive driving wheel having provision for adjustable and accurate counterbalancing.

Modern locomotives usually have two to five or even more driving wheels on each side. Each driving wheel has a crank pin to which is connected the driving mechanism. The connecting rod from the cross-head of the steam cylinder is connected to the crank pin of one wheel. The other wheels are coupled to this wheel through side rods. The result is that the weight carried by the crank pins of different wheels which must be counterbalanced varies with the position of the wheel. For example, the wheel to which the connecting rod is directly connected has a maximum weight to be counterbalanced; the end wheel to which the end of one side rod is connected has the minimum weight to be counterbalanced; while a wheel intermediate the end wheel and the wheel carrying the connecting rod has an intermediate weight to be counterbalanced since it carries the adjacent ends of two side rods. In accordance with the present invention, a single standard casting may be used for various wheels and the amount of counterbalancing weight can be readily and accurately adjusted for a wheel in any position.

In the drawing, which illustrates the preferred embodiment of the invention:

Fig. 1 is an elevation partly in section of a locomotive driving wheel casting embodying my invention;

Fig. 2 is a section along the line II—II of Fig. 1; and

Fig. 3 is a section along the line III—III of Fig. 1 showing an empty pocket sealed with a short length of tubing.

In the illustrated embodiment of the invention there is illustrated the casting, which constitutes the principal part of the locomotive driving wheel. This casting has a hub 1 having a central bore 2 to receive the axle of a pair of wheels. The casting has a rim 3 which is turned in a lathe and over which is shrunk a hard steel flanged tire which engages the railroad rail. The wheel has a crank pin hub 4 having a bore 5 for the reception of the usual crank pin. The rim and hub are connected by spokes. The full-length spokes are indicated by reference numerals 6. Shorter spokes 7 connect the crank pin hub 4 with the rim. The three short spokes 8 extend from the hub to the counterweight, which is indicated generally by reference numeral 9. The counterweight 9 is of segmental shape. The inner face 10 of the counterweight is shown as lying along a chord, the middle portion of which is approximately equi-distant between the center of the hub and the rim, although somewhat nearer the rim. The greater the amount of counterweight required, the closer the chord will be to the center hub, for a wheel of given diameter. The outer face 11 of the counterweight has the shape of the arc of the circumference of the wheel. The counterweight 9 is solid except for the pockets hereinafter described for holding lead or other counterweighting material, so that the radial depth of the counterbalance is kept at a minimum.

The counterweight is cored so as to form a series of pockets 12, 13, 14 and 15 along its chord side. These pockets are separated by the partitions 16, 17 and 18 which are aligned with and form continuations of the shortened spokes 8. The walls of these pockets are of heavy cross section to give the requisite strength to the wheel whether the pockets are filled or empty. The pockets are shown as provided with aligned openings 19 on each side of the wheel, but the openings may be on one side only if desired. The larger pockets 13 and 14 preferably have four such holes while the smaller pockets 12 and 15 have each two such aligned holes. These holes provide for the removal of the core material used in casting the wheel and for filling in with lead or other counterweighting material. The aligned holes 19 are preferably reamed so that the pockets which are not filled with lead may be sealed by welding in the holes a short length of tubing 20 as shown in Fig. 3 to prevent foreign matter getting into an empty pocket. The counterweight is provided with supplemental pockets 21 which may contain lead for accurately adjusting the counterbalancing of the wheel. The holes 21 are preferably open at one side only of the wheel. Lead may be poured into these holes as required and the weight may be adjusted by drilling out excess lead. Or lead discs may be driven into the holes to give adjustable weight. The holes are sealed by welded-in steel discs 22, as shown in Fig. 2, or by any other suitable means.

It will be noted that the major pockets 12, 13, 14 and 15 are formed along the inner or chord side of the counterweight 9 and that the smaller pockets 21 for the fine adjustment are formed along the outer or arc face. The weight of the counterweight 9 as cast with the wheel is concentrated mainly at its arc side, which permits the counterweight to be reduced to a minimum. Also the counterweighting material applied in the pockets 21 for the fine adjustment is applied at the greatest distance from the wheel center and where it is most effective.

For a six-wheel locomotive (three wheels on each side) the weight of the steel cast into the counterweight may be such as to give the requisite counterbalancing, subject if desired to finer adjustment by lead in the adjusting pockets 21, for the front and rear wheels, and the intermediate wheel to which the connecting rod is connected may be counterbalanced by filling the pockets 12, 13, 14 and 15 and then accurately adjusting the counterbalance by lead in the pockets 21. Where more than six wheels are employed, the desired counterbalancing can be secured by filling some or all of the pockets 12, 13, 14 and 15 and then accurately counterbalancing by means of adjusted quantities of lead in the pockets 21. For example, the minimum counterbalance can be had by leaving the pockets 12, 13, 14 and 15 all empty. The next step in counterbalance can be secured by filling the smaller pockets 12 and 15 only. The next step in counterbalance can be secured by filling the larger pockets 13 and 14 only. A fourth and final step in counterbalancing can be secured by filling all four pockets 12, 13, 14 and 15. The pockets are arranged in pairs of equal size, 12 and 15 and 13 and 14, so as to provide for the counterbalancing weight opposite the crank pin. By making the pairs of pockets of the proper size, the correct counterbalancing can be secured for locomotives having any number of drive wheels now in use, using a standard basic wheel casting having properly proportioned counterweight holding pockets, and then filling the proper pockets to counterbalance a wheel for its position on the locomotive. The final balancing of the wheel to meet whatever conditions are encountered in operation, is accomplished by suitably adjusting the weight added to the pockets 21.

The present invention is not limited to its illustrated embodiment but may be otherwise embodied and practiced within the scope of the following claims.

I claim:

1. A steel casting for a locomotive driving wheel which is adapted to be mounted in one of several positions on a locomotive, comprising a hub, a rim, connecting spokes between the hub and rim, a crank pin hub, and a steel counterweight of segmental shape cast integral with the wheel and whose mass even when it is loaded with counterweighting material is still constituted principally of the cast steel and located at the side of the wheel opposite the crank pin hub and having its arc face forming a part of the rim and its chord face connected with the wheel hub by shortened spokes, said counterweight being sufficient in itself approximately to balance the wheel properly for the wheel position requiring the minimum counterweight and having a series of pockets formed along its chord edge adapted to receive counterweighting material, said pockets being of such size that when more or less of them are filled with counterweighting material the wheel is thereby approximately balanced for wheel positions requiring more than the minimum counterweight, said counterweight also having a series of supplemental pockets along its arc edge adapted to receive counterweighting material for fine adjustment of the balance of the wheel, the series of pockets along the chord edge having a greater volume than that of the series of pockets along the arc edge so that the weight of the cast steel of the counterweight is concentrated mainly along the arc edge of the counterweight.

2. A steel casting for a locomotive driving wheel which is adapted to be mounted in one of several positions on a locomotive comprising a hub, a rim, connecting spokes between the hub and rim, a crank pin hub, and a steel counterweight of segmental shape cast integral with the wheel and whose mass even when it is loaded with counterweighting material is still constituted principally of the cast steel and located at the side of the wheel opposite the crank pin hub and having its arc face forming a part of the rim and its chord face connected with the wheel hub by shortened spokes, said counterweight being sufficient in itself approximately to balance the wheel properly for the wheel position requiring the minimum counterweight and having a series of pockets formed along its chord edge adapted to receive counterweighting material, said pockets being arranged in pairs and so proportioned that when more or less of the pairs of pockets are filled with counterweighting material the wheel is approximately balanced for wheel positions requiring more than the minimum counterweight, said counterweight also having a series of supplemental pockets along its arc edge adapted to receive counterweighting material for fine adjustment of the balance of the wheel, the volume of the series of pockets along the arc edge being less than that of the volume of the series of pockets along the chord edge whereby the weight of the cast steel of the counterweight is concentrated mainly along its arc edge.

ERWIN G. MANGELS.